Nov. 18, 1947.   H. G. INGERSOLL   2,431,042
PROCESS FOR OBTAINING CLEAR FILMS FROM ETHYLENE POLYMERS
Filed Sept. 2, 1943
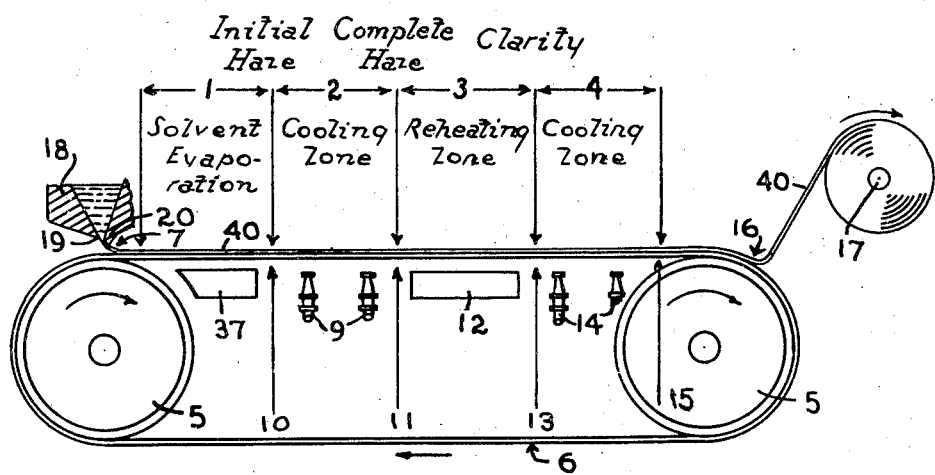
Inventor
Henry G. Ingersoll
By R. F. Miller.
Attorney Patented Nov. 18, 1947

2,431,042

UNITED STATES PATENT OFFICE 2,431,042

PROCESS FOR OBTAINING CLEAR FILMS FROM ETHYLENE POLYMERS

Henry G. Ingersoll, Wilmington, Del., assignor to E. I. du Pont de Nemours & Company, Wilmington, Del., a corporation of Delaware Application September 2, 1943, Serial No. 500,979

3 Claims. (Cl. 18—57)

This invention relates to a process for preparing clear films from normally solid ethylene polymers.

It has previously been known that quenching of heated ethylene polymer films leads to an improvement in the clarity of such films.

It is an object of this invention to provide simple and practical methods for preparing clear ethylene polymer films. It is another object to provide a process for preparing clear ethylene polymer films without having to quench said films. Other objects will appear hereinafter.

The above and other objects appearing hereinafter are attained by a process employing the steps in combination of cooling the clear molten films until the haze which normally accompanies crystallization of the polymer appears, allowing substantially maximum haze formation to occur, reheating the hazy film until the haze disappears, and then recooling the film.

In one form of practicing the invention a film of the desired thickness is cast or extruded from a melt of the ethylene polymer onto a suitable support, the film is permitted to set-up, cooled until maximum haze appears, the film is then heated until the haze just disappears, e. g. to the temperature of clarity or not more than 1° or 2° C. above that temperature which is below the melting point of the polymer, and then cooled again. Instead of casting the film from a melt, it may be cast from a solution in an organic solvent or from a dispersion, the solvent or the dispersing medium evaporated, the film heated to above the melting point of the polymer, cooled until maximum haze appears, and then further heated as described above.

Suitable means for carrying this invention into practice is shown in the single figure of the drawing which is a diagrammatic view, in elevation, of a belt casting machine.

In this mechanism two supporting wheels 5 carry an endless belt 6 of smooth chromium plated steel. In actual operation the film 40 is cast from solution or extruded from a melt upon the belt at 7 from a hopper 18 having extrusion lips 19 and 20. Solvent, if present, is evaporated in the region 1. If the film is cast from solution the polymer is brought to the melting point by means of a heating device consisting of a heated surface or other heating means indicated generally at 37. When the polymer is extruded from melt the heating at this stage can be omitted. Haze formation, through suitable cooling means, for example, nozzles 9 directing cooling fluid against the underside of the belt, occurs at about position 10 of the film on the belt. The cooling zone is indicated by the numeral 2. Complete haze occurs at 11 and by means of a heating device 12 the film is reheated within the zone 3 to clarity at 13. A second cooling means 14 similar to that indicated by the numeral 9 is placed between the position 13 and the point 15 adjacent the wheel or drum 5 to cool the film in the zone 4 sufficiently for final stripping of the film from the wheel at 16. The stripped film is then wrapped upon the wind-up roll 17.

The polymers used in the practice of this invention are the solid ethylene polymers made by heating ethylene alone as described in U. S. Patents 2,153,553 and 2,188,465 or in admixture in substantial or major amount with another polymerizable unsaturated organic compound, as described in U. S. Patent 2,200,429. The polymers of ethylene alone or in admixture with other polymerizable organic compounds can also be obtained by contacting ethylene alone or in admixture with other polymerizable organic compounds with water and a percompound catalyst, preferably a diacyl peroxide at temperatures of from 40° to 350° C. and at pressures in excess of atmospheric, preferably in the range of 50 to 1500 atmospheres. The polymers of ethylene alone are solid at normal temperatures, correspond in compositions substantially to $(CH_2)_x$, and have molecular weights above 6000. The properties of the polymers of ethylene with other polymerizable organic compounds depend upon the composition of the polymer and the nature of the polymerizable unsaturated compound.

The invention is further illustrated by the following examples.

Example I

Ten grams of a normally solid ethylene polymer having a molecular weight of about 9000 and an intrinsic viscosity of 0.55 (measured on a 0.125% solution in xylene at 85° C.) are dissolved in 90 g. of xylene. A film of 12 mils in thickness is cast from this solution on a chromium plated steel plate provided with temperature regulating means, a tight cover to exclude air from the surface of the plate, means for passing air at various temperatures over the plate surface, and a thermo-couple to measure the temperature. The film cast on the plate is heated to 112° C. to 115° C., the temperature of the place raised in 2 to 5 minutes to 130° C., and warm air is passed over the film to remove the xylene. After 10 minutes the air current is turned off, at the end of 15 minutes the film is cooled until haze formation is complete, the film is reheated until it is clear, cooled to room temperature, and stripped from the plate.

For comparison films were prepared duplicating the above procedure, except that in one instance the melted film is quenched with water and in the other the quenching step is omitted.

The relative clarity of these three films is measured by placing them between glass plates and determining their transmission to monochromatic ultraviolet radiation. Surface effects are calculated by coating the film surfaces with thin lubricating oil, and transmission losses at the glass plate compensated. The results are shown in the table below.

| Film | Per Cent Transmission of the Film Gamma=5,460 A. U. | | |
|---|---|---|---|
| | Film+2 Surfaces | Film+ Upper Surface | Film |
| Quenched | 86 | 91 | 99 |
| Unquenched | 50 | 55 | 87 |
| Cooled, reheated and recooled | 85 | 91 | 98 |

From the above it is evident that the film prepared by the method of this invention is as clear as the quenched film, within the accuracy of the measurement.

Moisture permeabilities of the three films prepared as above are as follows:

| Film | Moisture Permeability Measured at 25° C. from 100% to 0% Rel. Humidity (Grams per 100 sq. meter per hr. for a 1 mil film) |
|---|---|
| Quenched | 25–25.6 |
| Unquenched | 21.6–20.4 |
| Cooled, reheated and recooled | 19.9–20.6 |

The above data shows that the film obtained by the method of the present invention is markedly less permeable to moisture than the quenched film.

*Example II*

A hazy translucent film of ethylene polymer is heated to 115° C. under the conditions described in Example I, cooled until haze formation is complete, reheated to clarity and recooled to room temperature. The resulting film is found to be optically clear.

The films prepared according to the process of this invention are tough, resistant to tearing, relatively impermeable to moisture and water, resistant to degradation during chemical and outdoor exposure, and remain flexible at low temperatures. Such films are of value as wrapping foils, as laminates with other organic film formers to be used in the fabrication of containers, and as foils for electrical insulation.

As many apparently widely different embodiments of this invention may be made without departing from the spirit and scope thereof, it is to be understood that I do not limit myself to the specific embodiments thereof except as defined in the appended claims.

I claim:

1. A process for obtaining clear films from solid ethylene polymers, said process comprising the continuous steps of forming a molten film of the polymer on a support heated to a temperature above that of the melting point of the polymer, cooling the support and molten film thereon to a temperature which is below the melting point of the polymer and which causes the appearance of haze accompanying crystallization of the polymer, continuing the cooling of the film and support until substantially maximum haze formation occurs, reheating the film to a temperature at which the film becomes clear but below the melting point of the polymer until the haze disappears, and then cooling the film over an appreciable period of time to room temperature.

2. A process for obtaining clear films from solid ethylene polymers, said process comprising extruding from a melt a continuous film of the polymer on a continuously moving support heated at the zone of casting the molten film thereon to a temperature above that of the melting point of the polymer, and subjecting said film and support while they are moving to the steps of cooling within a zone extending over a substantial distance of the travel of said film and said support to a temperature which is below the melting point of the polymer and which causes, when the film enters said zone, the appearance of haze accompanying crystallization of the polymer, continuing the cooling until substantially maximum haze formation occurs in the film at the completion of the travel of the film through said zone, reheating the film and moving support to a temperature at which the film becomes clear but still below the melting point of the polymer, and maintaining this temperature until the haze disappears from the film, and then recooling the film and support from said last mentioned temperature to room temperature during a substantial distance of the travel of said film and said support.

3. A process for obtaining clear films from solid ethylene polymers, said process comprising extruding from a solution a continuous film of the polymer on a continuously moving support heated at the zone of casting the film thereon to a temperature above that of the melting point of the polymer, and subjecting said film and support while they are moving to the steps of cooling within a zone extending over a substantial distance of the travel of said film and said support to a temperature which is below the melting point of the polymer and which causes, when the film enters said zone, the appearance of haze accompanying crystallization of the polymer, continuing the cooling until substantially maximum haze formation occurs in the film at the completion of the travel of the film through said zone, reheating the film and moving support to a temperature at which the film becomes clear but still below the melting point of the polymer, and maintaining this temperature until the haze disappears from the film, and then recooling the film and support from said last mentioned temperature to room temperature during a substantial distance of the travel of said film and said support.

HENRY G. INGERSOLL.

REFERENCES CITED

The following references are of record in the file of this patent:

UNITED STATES PATENTS

| Number | Name | Date |
|---|---|---|
| 2,212,770 | Foster | Aug. 27, 1940 |
| 2,205,449 | Wiley | June 25, 1940 |
| 2,210,771 | Myles et al. | Aug. 6, 1940 |
| 2,219,700 | Perrin et al. | Oct. 29, 1940 |
| 2,177,660 | Kimble et al. | Oct. 31, 1939 |
| 2,221,019 | Clarke | Nov. 12, 1940 |
| 2,309,370 | Williams | Jan. 26, 1943 |
| 2,311,818 | Dawson | Feb. 23, 1943 |